I. POWERS.
Wagon-Seats.

No. 143,715. Patented Oct. 14, 1873.

Witnesses:
Henry N. Miller
C. L. Evert

Inventor.
Isaac Powers
per
Alexander Mason
Attorneys.

UNITED STATES PATENT OFFICE.

ISAAC POWERS, OF LAINGSBURG, MICHIGAN.

IMPROVEMENT IN WAGON-SEATS.

Specification forming part of Letters Patent No. 143,715, dated October 14, 1873; application filed July 2, 1873.

*To all whom it may concern:*

Be it known that I, ISAAC POWERS, Laingsburg, in the county of Shiawassee and in the State of Michigan, have invented certain new and useful Improvements in Wagon-Seat; and do hereby declare that the following is a full, clear, and exact description thereof, reference being had to the accompanying drawings and to the letters of reference marked thereon making a part of this specification.

The nature of my invention consists in the construction of a spring-seat for vehicles, as hereinafter more fully set forth.

Figure 1:
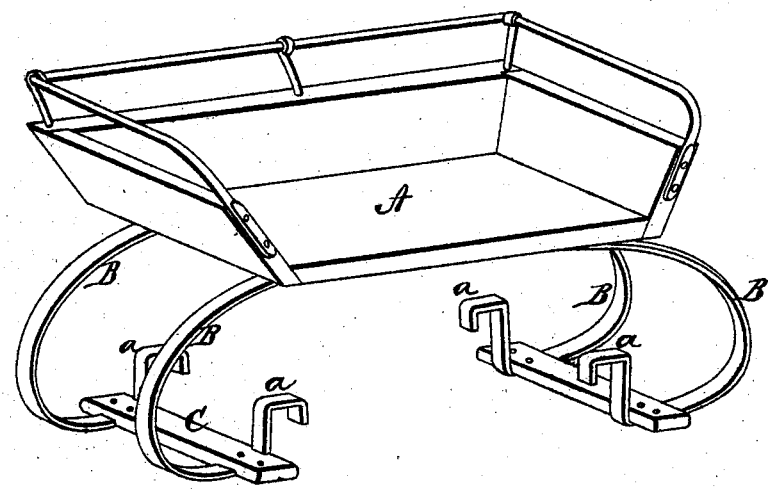
Figure 2:
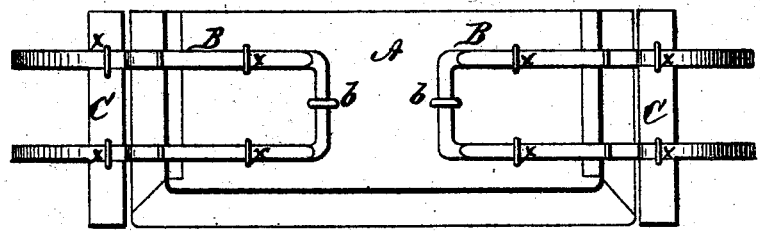

Figure 1 of the accompanying drawings represents a perspective view, and Fig. 2 a bottom view, of the seat and its springs.

A represents the seat of a vehicle, made in any of the known forms. To the bottom of this seat at each end are attached the springs B B. Each spring is made of one piece of metal and forms two spring-bearings at each end of the seat. In Fig. 2 will be seen the form that the inner ends of each spring is bent, and that each are secured to the seat bottom by means of the keepers $b$ $x$ $x$. The outer end of each prong of each spring is bent around, as shown in Fig. 1, so that the curve or spring portion of the metal is on the outside of the vehicle upon which the seat is placed. The extremities of each prong of each spring are extended upward and inward, as shown, to form hooks $a$ $a$, which are for the purpose of catching over the sides of the wagon-body. The two prongs of each spring are connected together by a bar, C, near the hooks $a$ $a$, to prevent their lower ends from separating or being forced too closely together.

By this construction of the spring the seat is perfectly balanced on the four prongs, and the entire seat with its springs can be quickly and easily attached to or detached from the vehicle.

Instead of catching the hooks over the sides of the wagon-body, they may be caught over short bars placed inside of the body of the vehicle.

I am aware that two curved springs which extend across the bottom of a wagon-seat, and have hooks at their ends for attachment to the bed of the wagon have been known before; hence I disclaim such to be my invention. With my invention two springs are used under each end of the seat, and the occupant of the seat receives the benefit of the spring, whether at either side or in the center of the seat.

In wagon-seats where the springs extend across the bottom of the seat and are secured in the center thereof, when one occupant rides he can only get the benefit of the springs by being in the center of the seat.

Having thus fully described my invention, what I claim is—

In combination with the seat A, the two springs B B, each bent, as shown, to form two prongs and two hooks, $a$ $a$, and connected to the seat-bottom at each end by the keepers and together by the boards C C, all substantially as set forth.

In testimony that I claim the foregoing I have hereunto set my hand this 25th day of June, 1873.

ISAAC POWERS.

Witnesses:
E. GOULD,
GEO. P. MOSES.